(12) United States Patent
Kang et al.

(10) Patent No.: US 7,604,921 B2
(45) Date of Patent: Oct. 20, 2009

(54) BLACK MATRIX COMPOSITION, BLACK MATRIX PREPARED USING THE SAME, METHOD OF FORMING A BLACK MATRIX PATTERN USING THE SAME AND METHOD OF MANUFACTURING A COLOR FILTER SUBSTRATE USING THE SAME

(75) Inventors: Yoon-Ho Kang, Yongin-si (KR); Byoung-Joo Kim, Anyang-si (KR); Jang-Sub Kim, Suwon-si (KR); Seong-Gyu Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 630 days.

(21) Appl. No.: 11/233,257

(22) Filed: Sep. 21, 2005

(65) Prior Publication Data

US 2006/0073398 A1    Apr. 6, 2006

(30) Foreign Application Priority Data

Sep. 22, 2004    (KR) .................... 10-2004-0076084

(51) Int. Cl.
*G03F 1/00*    (2006.01)
*G03C 1/725*    (2006.01)
*G03C 1/73*    (2006.01)
*G03C 1/735*    (2006.01)
*C09K 19/52*    (2006.01)

(52) U.S. Cl. .................... 430/286.1; 430/271.1; 430/7; 252/299.01

(58) Field of Classification Search ........... 430/7, 430/271.1, 286.1; 252/299.01
See application file for complete search history.

(56) References Cited

U.S. PATENT DOCUMENTS

2005/0158659 A1*    7/2005    Lee .................... 430/271.1

* cited by examiner

*Primary Examiner*—Geraldina Visconti
(74) *Attorney, Agent, or Firm*—Innovation Counsel LLP

(57) ABSTRACT

A black matrix composition includes about 40 parts by weight of a pigment dispersion, about 0.1 to about 1.0 part by weight of a photoinitiator, about 5 to about 20 parts by weight of a photo-polymerizable monomer, about 5 to about 20 parts by weight of a binder resin including an acryl-based copolymer containing fluorine and having a hydroxyl group combined with a side chain of the acryl-based copolymer, about 0.1 to about 0.5 part by weight of epoxy-based monomer containing fluorine and about 35 to about 55 parts by weight of a solvent. A black matrix pattern formed of the black matrix minimizes an ink bleed, thereby improving color property of a liquid crystal display device to which the black matrix pattern is applied.

25 Claims, 4 Drawing Sheets

BLACK MATRIX COMPOSITION, BLACK MATRIX PREPARED USING THE SAME, METHOD OF FORMING A BLACK MATRIX PATTERN USING THE SAME AND METHOD OF MANUFACTURING A COLOR FILTER SUBSTRATE USING THE SAME

CROSS-REFERENCE TO RELATED APPLICATION

This application relies for priority upon Korean Patent Application No. 2004-76084 filed on Sep. 22, 2004, the contents of which are herein incorporated by reference in its entirety.

BACKGROUND OF THE INVENTION

1. Field of the Invention

The present invention relates to a black matrix composition, a black matrix prepared using the black matrix composition, a method of forming a black matrix pattern using the same and method of manufacturing a color filter substrate using the black matrix composition. More particularly, the present invention relates to a black matrix composition having great hydrophobicity, a black matrix capable of preventing an ink bleed and being prepared using the black matrix composition, a method of forming a black matrix pattern using the black matrix composition and a method of manufacturing a color filter substrate using the black matrix composition.

2. Description of the Related Art

In the modern electronic age, an electric display device is considered to be more and more important, and the various electric display devices are widely used in numerous applications. Thus, new electronic display devices having novel functions corresponding to consumer demands are continually developed.

In general, an electric display device converts electric information into an image. Such devices may be classified as either emissive display devices or non-emissive display devices. An emissive display device displays an image using light emission, whereas a non-emissive display device displays an image using optical properties such as reflection, scattering, interference, etc. Emissive display devices may be referred to as "active display devices." Examples of an emissive display device include a cathode ray tube (CRT), a plasma display panel (PDP), a light emitting diode (LED), an electroluminescent display (ELD), etc. Examples of a non-emissive display device include a liquid crystal display (LCD) device, an electrophoretic image display (EPID), etc.

The CRT, conventionally used in image display instruments such as television sets, computer displays, etc., is most widely used due to its great image quality and low price. However, the CRT has disadvantages such as heavy weight, large size, high power consumption, etc.

Because of these disadvantages, novel electric display devices are required to have small size and lightweight due to fast progress in the semiconductor technology. Therefore, flat panel display devices having characteristics such as thinness, low driving voltage, low power consumption, etc., are highly demanded.

Among the presently developed flat panel display devices, liquid crystal display devices have thinness, low driving voltage, and low power consumption as compared to CRTs, and also have an image display quality substantially the same as CRTs, such that liquid crystal display devices are widely used. Further, liquid crystal display devices can be easily manufactured, thereby expanding their applications into various areas.

A liquid crystal display apparatus includes color filters such as a red color filter, a green color filter, a blue color filter, etc., to express a color image.

Recently, in order to manufacture a color filter, various processes are applied for manufacturing color filters to replace conventional photolithography processes. Typically, an ink jetting process is used during manufacture of a color filter. In an ink jetting process, a light-blocking layer such as a black matrix is formed on a glass substrate, and the light-blocking layer undergoes an exposing process, and also a developing process to form a pixel area on the blocking layer. An ink is injected into the pixel area to form the color filter. In the ink jetting process, additional processes such as a coating process are not required, thereby reducing the required materials for performing the additional processes and simplifying manufacture.

In general, the ink injected into the pixel area contains a pigment, a solvent and a dispersant, and the ink is a hydrophilic composition in a liquid state. When the ink is injected into the pixel area, more ink is injected than necessary to fill a volume of the pixel area in view of the ink volatility. Accordingly, the ink overflows from the pixel area to a surface of the black matrix, and thus an ink bleed is generated between adjacent pixel areas. When the ink bleed is generated between these adjacent pixel areas, color properties of the liquid crystal display device are deteriorated, thereby also deteriorating display quality of the liquid crystal display device.

SUMMARY OF THE INVENTION

In accordance with an aspect of the present invention, a black matrix composition is provided having a great hydrophobicity.

In accordance with another aspect of the present invention, a black matrix is provided that is prepared using the above black matrix composition, the black matrix being capable of preventing an ink bleed.

In accordance with another aspect of the present invention, a method of forming a black matrix pattern on a base substrate using the above black matrix composition is provided.

In accordance with another aspect of the present invention, a method of manufacturing a color filter substrate using the above black matrix composition is provided.

In accordance with another aspect of the present invention, a black matrix composition includes about 40 parts by weight of a pigment dispersion, about 0.1 to about 1.0 part by weight of a photoinitiator, about 5 to about 20 parts by weight of a photo-polymerizable monomer, about 5 to about 20 parts by weight of a binder resin, about 0.1 to about 0.5 part by weight of epoxy-based monomer containing fluorine, and about 35 to about 55 parts by weight of a solvent. The binder resin includes an acryl-based copolymer containing fluorine and has a hydroxyl group combined with a side chain of the acryl-based copolymer.

In accordance with another aspect of the present invention, there is provided a method of forming a black matrix pattern. First, a black matrix composition is coated on a base substrate. The black matrix composition is then dried to form a black matrix composition layer on the base substrate. The black matrix composition includes about 40 parts by weight of a pigment dispersion, about 0.1 to about 1.0 part by weight of a photoinitiator, about 5 to about 20 parts by weight of a photo-polymerizable monomer, about 5 to about 20 parts by weight of a binder resin, about 0.1 to about 0.5 part by weight of epoxy-based monomer containing fluorine, and about 35 to about 55 parts by weight of a solvent. The binder resin includes an acryl-based copolymer containing fluorine and having a hydroxyl group combined with a side chain of the acryl-based copolymer Then the black matrix composition layer is exposed to light through a photo mask disposed over the black matrix composition layer to partially photo-polymerize the exposed black matrix composition layer. A developing solution then removes any un-exposed black matrix in the black matrix composition layer. The resulting developed black matrix composition layer is heated so as to cure and cross-link the black matrix composition to form a thermally cross-linked resin in the black matrix composition layer.

In accordance with still another aspect of the present invention, a black matrix includes a photopolymer and a thermally cross-linked resin. The photopolymer is polymerized from photo-polymerizable monomers using a photoinitiator. The photo-polymerizable monomer includes entaerythritol triacrylate, dipentaerythritol pentacrylate and dipentaerythritol hexacrylate, etc. The photoinitiator includes an acetophenone-based compound, a biimidazole-based compound and a triazine-based compound, etc. The thermally cross-linked resin includes a polymer of formula (1):

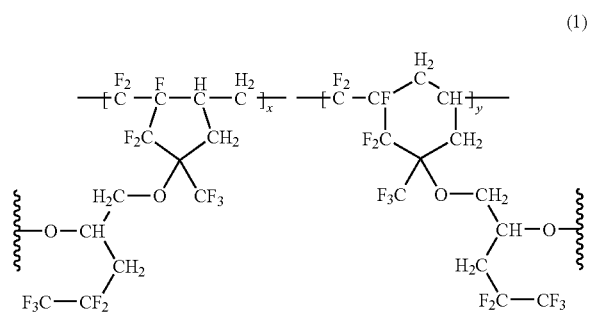

(1)

wherein 'X' denotes a natural number of 10 to 1000, and 'Y' denotes a natural number of 10 to 1000.

In accordance with still another aspect of the present invention, there is provided a method of manufacturing a color filter substrate. First, a black matrix composition is coated on a base substrate and then dried to form a black matrix composition layer on the base substrate. The black matrix composition includes about 40 parts by weight of a pigment dispersion, about 0.1 to about 1.0 part by weight of a photoinitiator, about 5 to about 20 parts by weight of a photo-polymerizable monomer, about 5 to about 20 parts by weight of a binder resin, about 0.1 to about 0.5 part by weight of epoxy-based monomer containing fluorine, and about 35 to about 55 parts by weight of a solvent. The binder resin includes an acryl-based copolymer containing fluorine and has a hydroxyl group combined with a side chain of the acryl-based copolymer.

The resulting black matrix composition layer is exposed to light through a photo mask disposed over the black matrix composition layer to partially photo-polymerize the exposed black matrix composition layer. Un-exposed black matrix in the black matrix composition layer may then be removed with a developing solution. The developed black matrix composition layer is heated so as to cure and cross-link the black matrix composition and forms a thermally cross-linked resin in the black matrix composition layer to form a black matrix pattern. An ink is injected into the black matrix pattern corresponding to the developed portion to form a color filter.

According to the above, the black matrix prepared using the black matrix composition contains fluorine on a surface of the black matrix to have hydrophobicity, and thus a large contact angle is formed between hydrophilic ink and the surface of the black matrix to prevent ink bleed generated around a pixel area. Therefore, the color property of a liquid crystal display apparatus may be improved.

BRIEF DESCRIPTION OF THE DRAWINGS

The above and other features and advantage points of the present invention will become more apparent by describing in detailed exemplary embodiments thereof with reference to the accompanying drawings.

DESCRIPTION OF THE INVENTION

Figure 1A:
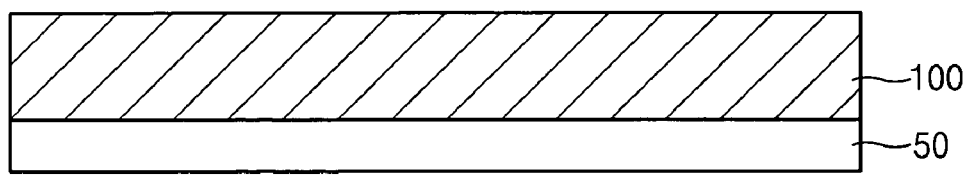
FIGS. 1A to 1D are cross-sectional views schematically illustrating a method of forming a black matrix pattern according to the present invention.

Hereinafter, the present invention will be described in detail.

Black Matrix Composition

A black matrix composition according to the present invention includes about 40 parts by weight of a pigment dispersion, about 0.1 to about 1.0 part by weight of a photoinitiator based on about 40 parts by weight of the pigment dispersion, about 5 to about 20 parts by weight of a photo-polymerizable monomer based on about 40 parts by weight of the pigment dispersion, about 5 to about 20 parts by weight of a binder resin based on about 40 parts by weight of the pigment dispersion, and about 0.1 to about 0.2 part by weight of an epoxy-based monomer based on about 40 parts by weight of the pigment dispersion, and about 35 to about 55 parts by weight of a solvent based on about 40 parts by weight of the pigment dispersion. The binder resin includes an acryl-based copolymer that contains fluorine and has a hydroxyl group combined with a side chain of the acryl-based copolymer The pigment dispersion includes a black-colored pigment to function as the black matrix light blocker. Black-colored pigments without carbon black have exceedingly low light-blocking properties, so that large amounts of such black-colored pigments are required, thereby increasing viscosity of the black matrix composition. Therefore, black matrix composition without carbon black may be difficult to handle. Also, strength or coherent force of a coated film having such a composition may be significantly deteriorated. Therefore, the black-colored pigment preferably contains carbon black.

Carbon black may be used alone or in a combination with other pigments. Examples of the other pigments available with carbon black may include carmine 6B, phthalocyanine green, phthalocyanine blue, perylene black, cyanine black, etc.

Carbon black is mixed with a solvent or a dispersant to form the pigment dispersion. Concerning viscosity and coherent force of the coated film in regard to a base substrate, carbon black preferably has a concentration of about 15% by weight to about 20% by weight in the pigment dispersion so as to reduce viscosity of the black matrix composition and enhance coherent force of the coated film.

Examples of the photoinitiator may include an acetophenone-based compound, a biimidazole-based compound and a triazine-based compound. These can be used alone or in a mixture thereof.

Examples of the acetophenone-based compound that can be used for the photoinitiator include 2-hydroxy-2-methylphenylpropane-1-on, 1-(4-isoprophylphenyl)-2-hydroxy-2-methylpropane-1-on, 4-(2-hydroxyethoxy)-phenyl-(2-hydroxy-2-prophyl)ketone, 1-hydroxycyclohexylphenylketone, benzoinmethyl ether, benzoinethyl ether, benzoin isobutyl ether, benzoinbutyl ether, 2,2-dimethoxy-2-phenylacetophenone, 2-methyl-(4-methylthio)phenyl-2-morpholyno-1-propane-1-on, 2-benzyl-2-dimethyamino-1-(4-morpholynophenyl)-buthane-1-on, 2-methyl-1-[4-(methylthio)-phenyl]-2-morpholynopropane-1-on, etc.

Examples of the biimidazole-based compound that may be used as the photoinitiator incude 2,2-bis(2-chlorophenyl)-4,4',5,5'-tetraphenyl biimidazole, 2-2'-bis-(o-chlorophenyl)-4,4',5,5'-tetrakis(3,4,5-trimethoxyphenyl)-1,2'-biimidazole, etc.

Examples of the triazine-based compound that may be used as the photoinitiator include 3-{4-[2,4-bis(trichloromethyl)-s-triazine-6-yl]phenylthio}propionic acid, 1,1,1,3,3,3-hexafloroisoprophyl-3-{4-[2,4-bis(trichloromethyl)-s-triazine-6-yl]phenylthio}propionate, ethyl-2-{4-[2,4-bis(trichloromethyl)-s-triazine-6-yl]phenylthio}acetate, 2-epoxyethyl-2-{4-[2,4-bis(trichloromethyl)-s-triazine-6-yl]phenylthio}acetate, cyclohexyl-2-{4-[2,4-bis(trichloromethyl)-s-triazine-6-yl]phenylthio}acetate, benzyl-2-{4-[2,4-bis(trichloromethyl)phenylthio]acetate, 3-{chloro-4-[2,4-bis(trichloromethyl)-s-triazine-6-yl]phenylthio}propionic acid, 3-{4-[2,4-bis(trichloromethyl)-s-triazine-6-yl]phenylthio}propionamide, 2,4-bis(trichloromethyl)-6-p-methoxystyryl-s-triazine, 2,4-bis(trichloromethyl)-6-(1-p-dimethylaminophenyl)-1,3-butadienyl-s-triazine, 2-trichloromethyl-4-amino-6-p-methoxystyryl-s-triazine, etc. Among the above triazine-based compounds, 2-epoxyethyl-2-{4-[2,4-bis(trichloromethyl)-s-triazine-6-yl]phenylthio}acetate, 2,4-bis(trichloromethyl)-6-p-methoxystyryl-s-triazine and cyclohexyl-2-{4-[2,4-bis(trichloromethyl)-s-triazine-6-yl]phenylthio}acetate are preferable since these compounds disassociate uniformly and rapidly in an irradiated organic black matrix composition layer to thereby reduce generation of a residual layer during a developing process.

The photoinitiator reacts with light in an exposed portion of the black matrix composition layer during a photo-masking act, and thus the photoinitiator forms a free radical molecule. The free radical molecule functions as an initiator for polymerizing the photo-polymerizable monomers, thereby starting a photo-polymerization chain reaction. Therefore, the photo-polymerization reaction is carried out in the exposed portion of the black matrix composition layer, so that the exposed portion is cured. However, the photo-polymerization reaction is not generated in un-exposed areas of the black matrix composition layer.

When a content of the photoinitiator is less than about 0.1 part by weight based on the about 40 parts by weight of the pigment dispersion, the polymerization reaction is not fully completed, thereby generating a loss of the black matrix composition layer during the developing process. Conversely, when the content of the photoinitiator exceeds about 1.0 part by weight based on the about 40 parts by weight of the pigment dispersion, solubility and storage stability of the photoinitiator deteriorates to induce an exceedingly sensitive state for forming a pattern in the black matrix. Hence, the content of the photoinitiator is preferably in a range of about 0.1 to about 1.0 part by weight based on the about 40 parts by weight of the pigment dispersion. The content of the photoinitiator is more preferably in a range of about 0.3 to about 0.6 part by weight based on the about 40 parts by weight of the pigment dispersion.

The photo-polymerizable monomers are photo-polymerized by the photo initiator to form the photopolymer during a photo-masking act. The photo-polymerizable monomer may include a functional monomer having at least one unsaturated group, and the functional monomer has a boiling temperature of about more than 100° C. Also, caprolactone compound may be introduced to the functional monomer. Since the functional monomer has the unsaturated group, the functional monomers may be addition-polymerized.

Examples of the photo-polymerizable monomer may include a mono functional monomer such as polyethylene glycolmono(meth)acrylate, polyprophylene glycolmono(meth)acrylate, phenoxyethyl(meth)acrylate, etc., and a multi functional monomer such as polyethylene glycol(meth)acrylate, poly prophyleneglycol(meth)acrylate, trimethylol ethane triacrylate, trimethylol propane triacrylate, neopenthylglycol(meth)acrylate, pentaerythritol tetra acrylate, pentaerythritol triacrylate, dipentaerithritol pentacrylate, dipentaerythritol hexa acrylate, etc. Among the photo-polymerizable monomers, dipentaerithritol pentacrylate and dipentaerythritol hexacrylate are preferable since these monomers are easily combined with the free radical molecules generated from the photoinitiator to increase photo curability. Here, dipentaerythritol hexacrylate has the most functional groups, so that dipentaerythritol hexacrylate has a great efficiency for photo curing.

When a content of the photo-polymerizable monomer is less than 5 parts by weight based on about 40 parts by weight of the pigment dispersion, photo curability is significantly lowered, so that a loss of the black matrix composition layer significantly increases. Conversely, if the content of the photo-polymerizable monomer exceeds 20 parts by weight based on about 40 parts by weight of the pigment dispersion, a desirable pattern shape for the black matrix is difficult to acquire. Hence, the content of the photo-polymerizable monomer is preferably in a range of about 5 to 20 parts by weight based on about 40 parts by weight of the pigment dispersion. The content of the photo-polymerizable monomer is more preferably in a range of about 8 to 15 parts by weight based on about 40 parts by weight of the pigment dispersion.

The photo-polymerizable monomers are polymerized through the photo-polymerization reaction to form the photopolymer so that the developing solution does not develop the photopolymer. Therefore, a portion of the black matrix composition layer that is not developed forms a black matrix pattern on the base substrate.

The binder resin contains fluorine, and a hydroxyl group that is combined with the side chain of the binder resin. The black matrix has hydrophobicity since the black matrix thereby contains fluorine. The hydroxyl group of the binder resin reacts with a developing solution during a developing process to form a salt, so that a non-exposed portion of the black matrix containing the binder resin is developed to form a pixel area. The binder resin may include an acryl-based copolymer containing fluorine and the hydroxyl group that is combined with the side chain of the acryl-based copolymer. An exemplary acryl-based copolymer is represented by the formula (2):

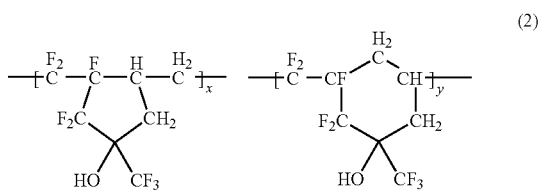

(2)

wherein, 'X' denotes a natural number of 10 to 1000, and 'Y' denotes a natural number of 10 to 1000. When X or Y is less than about 10, a synthesis of the copolymer is difficult to be performed. When X or Y exceeds about 1000, solubility of the binder resin significantly decreases.

The binder resin may further include a copolymer polymerized through polymerizing monomers including glycidylmethacrylate, styrene and cyclohexyl methacrylate. When a content of this copolymer is less than about 400 parts by weight based on about 100 parts by weight of the acryl-based copolymer, thermal endurance of the black matrix is deteriorated. Conversely, when the content of the copolymer exceeds about 500 parts by weight based on about 100 parts by weight of the acryl-based copolymer, hydrophobicity at a surface of the black matrix is lowered. Hence, the content of the above copolymer is preferably in a range of about 400 to about 500 parts by weight based on the acryl-based copolymer. The content of the above copolymer is more preferably in a range of about 430 to about 460 parts by weight based on the acryl-based copolymer.

The epoxy-based monomer contains an epoxy group having a ring structure. When the black matrix composition layer is heated, a ring-opening reaction of the epoxy group is induced, and then the opened epoxy group reacts with the hydroxyl group in the binder resin to improve cross-linking and heat resistance of the black matrix layer. The epoxy-based monomer includes at least one of compounds represented by formulae (3) and (4):

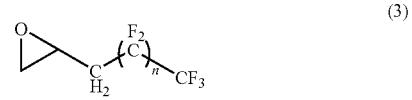

(3)

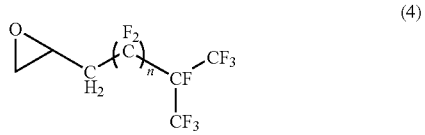

(4)

wherein, 'n' is a natural number of 1 to 20.

When a content of the epoxy-based monomer is less than 0.1 part by weight based on about 40 parts by weight of the pigment dispersion, hydrophobicity and cross-linking of the surface of the black matrix is lowered. Conversely, when the content of the epoxy-based monomer exceeds 0.5 part by weight based on about 40 parts by weight of the pigment dispersion, storage stability of the black matrix composition deteriorates, resulting in possible defects in the black matrix pattern. Also, particles may be generated on the surface of the black matrix. Hence, the content of the epoxy-based monomer is preferably in a range of about 0.1 to about 0.5 part by weight based on about 40 parts by weight of the pigment dispersion. The content of the epoxy-based monomer is more preferably in a range of about 0.2 to about 0.4 part by weight based on about 40 parts by weight of the pigment dispersion.

Examples of the solvent may include monomethylglycol monomethyl ether, prophyleneglycol monomethyl ether acetate, ethyleneglycol monomethyl ether acetate, ethylethoxy propionate, cyclohexanone, diethyleneglycol dimethyl ether, etc. These solvents may be used alone or in a mixture thereof. The above solvents have great solubility, high degree of dispersion of the pigment and excellent coating property to improve physical properties of the black matrix.

When a content of the solvent is less than 35 parts by weight based on about 40 parts by weight of the pigment dispersion, solute stability deteriorates. Conversely, when the content of the solvent exceeds 55 parts by weight based on about 40 parts by weight of the pigment dispersion, the black matrix composition layer does not have a required thickness. Hence, the content of the solvent is preferably in a range of about 35 to about 45 parts by weight based on about 40 parts by weight of the pigment dispersion. The content of the solvent is more preferably in a range of about 38 to about 42 parts by weight based on about 40 parts by weight of the pigment dispersion.

The black matrix composition may further include additives such as a surfactant, an anti-foaming agent, etc. The surfactant improves coating stability, and the anti-foaming agent prevents generation of micro-bubbles. A content of the additives is preferably in a range of about 0.001 to about 0.002 part by weight based on about 40 parts by weight of the pigment dispersion. A micro amount of the above additives may also be effective.

The black matrix composition has fluorine that is exposed from the black matrix surface when forming a black matrix pattern, so that the black matrix pattern formed by the black matrix composition has hydrophobicity. Therefore, the black matrix pattern increases a contact angle of a hydrophilic ink in contact with the black matrix to effectively reduce ink bleed.

Figure 2A:
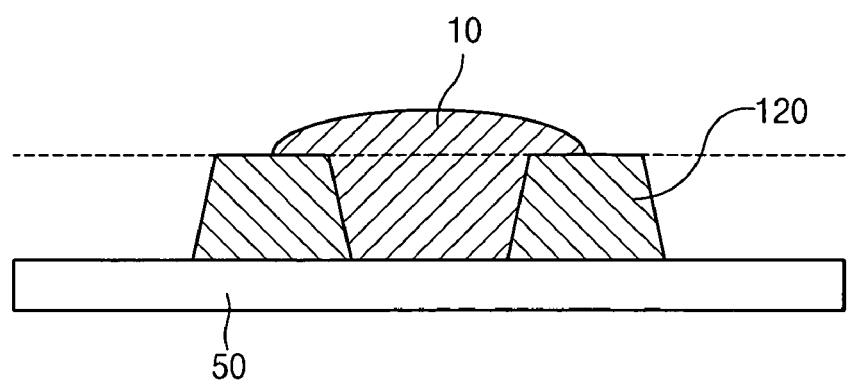
FIGS. 2A and 2B are cross-sectional views illustrating a hydrophobic effect of the black matrix pattern.
Figure 2B:
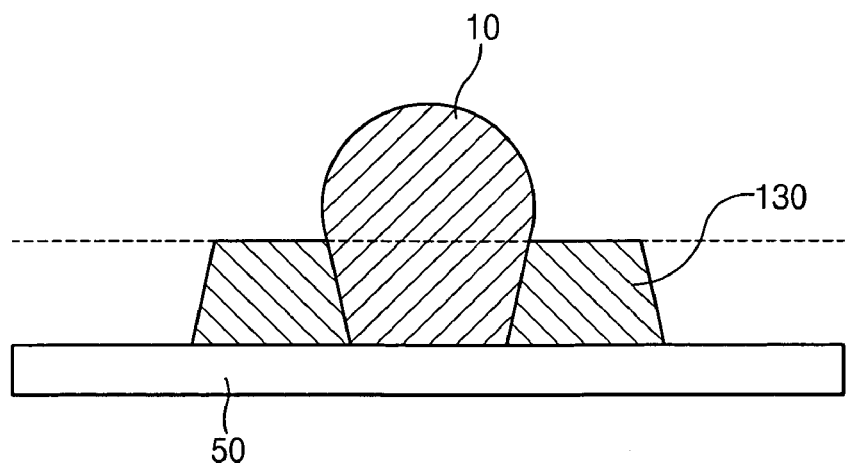

Referring now to FIGS. 2A and 2B, an ink 10 overflowed from a black matrix 120 spreads around a pixel area of the black matrix 120 in FIG. 2A since the black matrix in FIG. 2A does not contain fluorine and thus does not have hydrophobicity. The black matrix 120 includes a conventional organic polymer compound. In contrast, the black matrix 130 in FIG. 2B according to the present invention contains fluorine, so that the black matrix 130 has hydrophobicity. Therefore, the ink 10 has a large contact angle, and the ink 10 overflowed from the black matrix 130 has a substantially vertical shape, so that the ink 10 does not spread beyond the pixel area.

Method of Forming a Black Matrix Pattern

Referring now to FIGS. 1A to 1D, a method of forming a black matrix pattern includes a step (I) of forming a black matrix composition layer, a photo-polymerizing step (II), a developing step (III) and a thermally cross-linking step (IV).

As seen in FIG. 1A, to form the black matrix composition layer onto a base substrate 50, a black matrix composition is coated on the base substrate 50 and dried. The black matrix composition according to the present invention includes about 40 parts by weight of a pigment dispersion. The black matrix composition also includes, about 0.1 to about 1.0 part by weight of a photoinitiator based on about 40 parts by weight of the pigment dispersion, about 5 to about 20 parts by weight of photo-polymerizable monomer based on about 40 parts by weight of the pigment dispersion, about 5 to about 20 parts by weight of a binder resin including an acryl-based copolymer that contains fluorine and a hydroxyl group combined with a side chain of the acryl-based copolymer based on about 40 parts by weight of the pigment dispersion, and about 0.1 to 0.2 part by weight of an epoxy-based monomer based on about 40 parts by weight of the pigment dispersion.

The black matrix composition is substantially same as the black matrix composition described above, therefore any further repetitive descriptions will be omitted hereinafter.

The base substrate 50 may comprise glass, triacetylcellulose (TAC), polycarbonate (PC), polyethersulfone (PES), polyethylenetherephtalate (PET), polyethylenenaphthalate (PEN), polyvinylalcohol (PVC), polymetylmethacrylate (PMMA), cyclo-olefin polymer (COP), etc. These may be used alone or in a mixture thereof.

The black matrix composition is coated on the base substrate 50 by a general method such as an immersing method, a spraying method, a rotating and spin-coating method, etc., to form the black matrix composition layer 100 on the base substrate 50. For example, when the spin-coating method is employed to form the black matrix composition layer 100 on the base substrate 50, a desirable thickness of the black matrix composition layer may be acquired by accordingly adjusting a solid content of the black matrix composition with regard to the type of spinning apparatus.

The black matrix composition coated on the base substrate 50 by using one of the above methods is heated to be a temperature of about 80° C. to about 130° C., and then the black matrix composition is dried. The above method of coating and drying the black matrix composition is referred to as "soft bake process". The soft bake process is performed to evaporate a solvent without generating thermal decomposition of a solid component of the black matrix composition. The soft bake process is continued until a concentration of the solvent in the black matrix composition is preferably minimized, and thus the soft bake process is performed until most of the solvent is evaporated. Therefore, the black matrix composition layer 100 is completely formed on the base substrate 50.

Figure 1B:
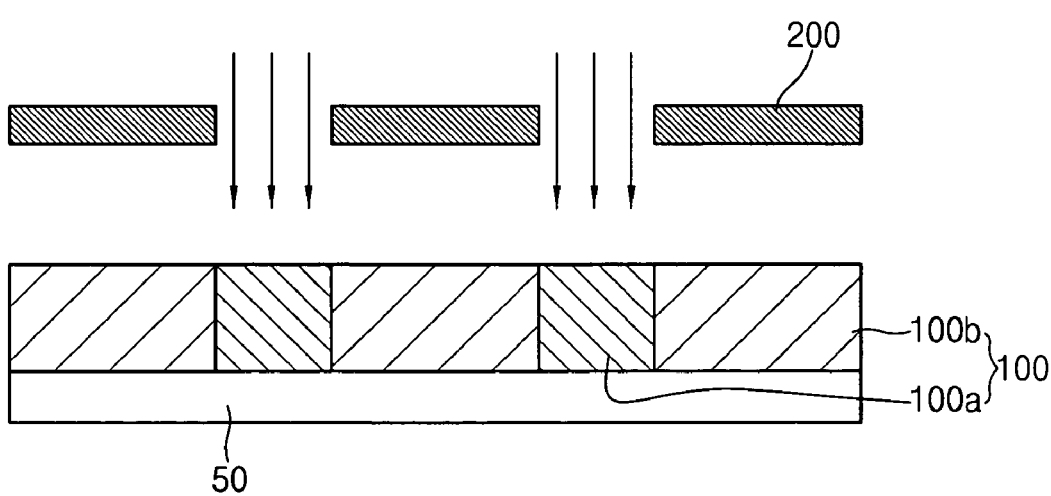

Referring now to FIG. 1B, the photo-polymerizing step (II) is performed by irradiating a light onto the black matrix composition layer 100 through a photo mask 200 disposed over the black matrix composition layer. The black matrix composition layer 100 may thus be classified into an exposed portion 100a and a non-exposed portion 100b. The exposed portion 100a is exposed to the light, and the non-exposed portion 100b is not exposed to the light. When a wavelength of the light for exposing the black matrix composition layer exceeds about 500 nm, photo-energy is insufficient to generate the free radical molecule from the photoinitiator. Conversely, when a wavelength of the light for exposing the black matrix composition layer is less than about 350 nm, the cost of generating light having a small wavelength is remarkably high.

The photoinitiator absorbs the light to form a free radical molecule in the exposed portion 100a. The photoinitiator functions as a polymerization initiator for photo-polymerizing the photo-polymerizable monomers contained in the exposed portion 100a. Therefore, photo-polymers polymerized from the photo-polymerizable monomers are contained in the exposed portion 100a. In contrast, the photo polymers are not formed in the non-exposed portion 100b, and thus the non-exposed portion 100b still contains the original photo-polymerizable monomers that are not polymerized.

Figure 1C:
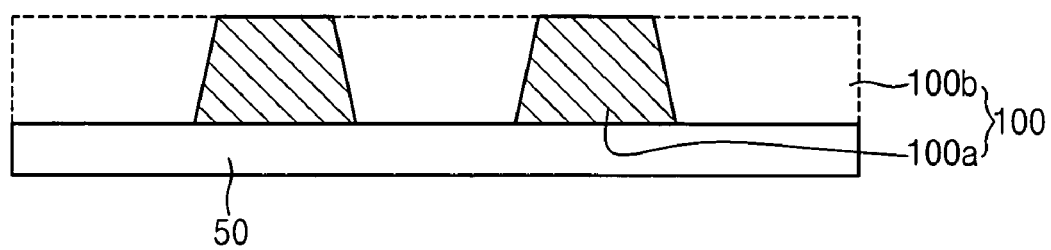

After the photo-polymerization step (II) is completed, the developing step (III) is performed. Referring to FIG. 1C, in the developing step (III), a developing solution is provided to the black matrix composition layer 100 to partially develop the black matrix composition layer 100 and to partially remove the developed black matrix composition layer 100. The black matrix composition layer 100 is developed at the exposed portion 100b to be removed. However, the non-exposed portion 100a is not developed since the photo-polymerizable monomers are changed to the photo-polymers. The developing solution includes potassium hydroxide (KOH). The binder resin contained in the exposed portion 100b reacts with the developing solution to form a salt. In particular, the hydroxyl group in the binder resin reacts with the developing solution to form the salt that is soluble in the developing solution. The salt formed by reacting the binder resin with the developing solution containing potassium hydroxide (KOH) is represented by the formula (5):

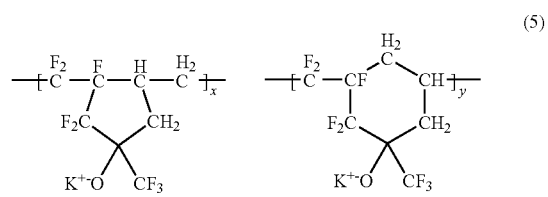

(5)

wherein, 'X' denotes a natural number of 10 to 1000, and 'Y' denotes a natural number of 10 to 1000.

As shown in the formula (5), the binder resin has a salt type that is soluble in the developing solution, that is, potassium ion is combined with oxygen ion of the hydroxyl group of the binder resin by an ionic force between these ions.

Referring again to FIG. 1C, the base substrate 50 corresponding to the removed exposed portion 100b is exposed to light through the removal of exposed portion 100b. The removed portion 100b functions as a pixel area 100b into which the ink is injected when forming the color filter by the ink jetting method. The non-exposed portion 100a becomes a black matrix that is interposed between the pixel areas 100b adjacent to each other.

Figure 1D:
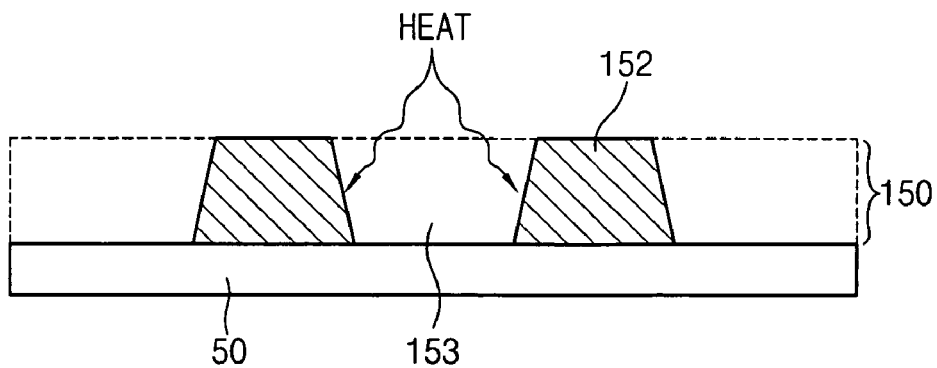

Referring now to FIG. 1D, a black matrix pattern 150 resulting from the removal of exposed portions 100b is heated to raise a temperature of the black matrix pattern 150 (IV). When the black matrix pattern 150 is heated, the binder resin reacts with the epoxy-based monomer to be thermally cross-linked. After the thermally cross-linking step (IV) is completed, a thermally cross-linked resin is contained in a black matrix 152 of the black matrix pattern 150.

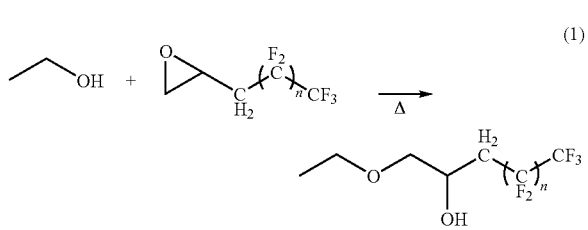

(1)

The thermal cross-linking reaction is performed by a mechanism represented by the above reaction equation (1).

In the reaction equation (1), 'n' denotes a natural number of 1 to 20.

The thermal cross-linking reaction begins with opening the epoxy-based monomer. The cross-linking reaction is preferably performed at a temperature of about 200° C. to about 250° C. The cross-linking reaction is preferably performed for about 0.7 to about 2 hours.

The thermally cross-linked resin is formed from the binder resin through the cross-linking reaction. The thermally cross-linked resin is represented by the formula (1):

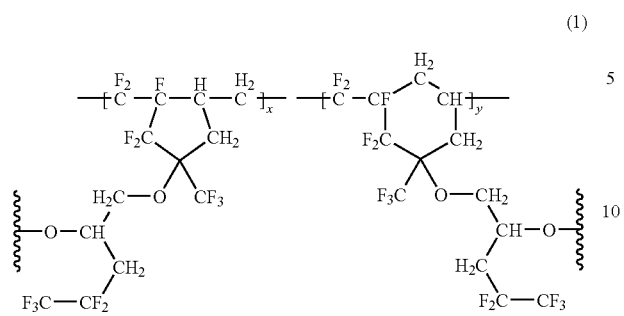

(1)

wherein, 'X' denotes a natural number of 10 to 1000, and 'Y' denotes a natural number of 10 to 1000

When raising a degree of cross-linking of the cross-linked resin, a heat resistance of the black matrix 152 may be improved. Further, the binder resin and the epoxy-based monomer have fluorine, so that the hydrophobicity of a surface of the black matrix 152 may be maximized.

Accordingly, the black matrix pattern 150 is completed. The black matrix pattern 150 includes the black matrix 152 and the pixel area 153 formed between adjacent black matrices 152.

Black Matrix

The black matrix pattern according to the present invention includes a pixel area and a black matrix that is formed by above described method. The black matrix is formed between adjacent pixel areas.

The black matrix includes a photo polymer and a cross-linked resin.

The photo-polymer is formed through polymerization of the photo-polymerizable monomers using a photoinitiator. Examples of the photo-polymerizable monomer include an acetopenone-based-compound, a biimidazole based-compound, a triazine based-compound, etc. These can be used alone or mixture thereof. Examples of the photoinitiator include a pentaerythritol tri acrylate, dipentaerythritol acrylate, dipentaerythritol hexacrylate, etc. These can be used alone or mixture thereof.

The cross-linked resin is represented by the formula (1):

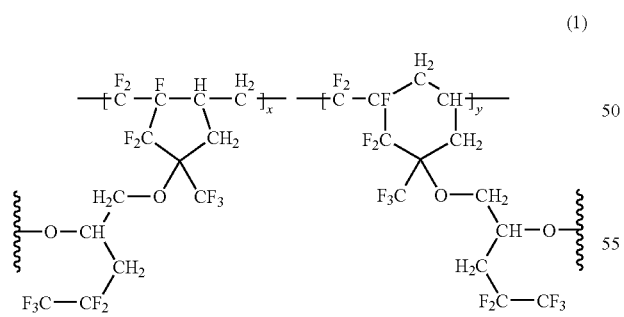

(1)

wherein, 'X' denotes a natural number of 10 to 1000, and 'Y' denotes a natural number of 10 to 1000.

When the content of the thermally cross-linked resin exceeds the content of the photo-polymer, physical properties of the black matrix are deteriorated. Conversely, when the content of the thermally cross-linked resin is less than the content of the photo polymer, hydrophobicity of the black matrix is remarkably reduced. Therefore, the thermally cross-linked resin and the photo-polymer are preferably contained by a weight ratio of about 1:1.

Hereinafter, the present invention is described in detail with reference to the following examples. The examples are given solely for the purpose of illustration and are not to be construed as limitations of the present invention, as many variations thereof are possible without departing from the spirit and scope of the invention.

Black Matrix Composition

EXAMPLE 1

Into about 43 g of prophyleneglycol monomethyl ether acetate (PGMEA) as a solvent, added were about 50 g of carbon black aqueous solution (15 wt %; average diameter of pigment: 90 nm), about 0.1 g of 2,4-bis(trichlorometyl)-6-p-methoxystyryl-s-triazine as a photoinitiator, about 15 g of dipentaerythritol hexacrylate as a photo-polymerizable monomer, about 14 g of a binder resin, about 0.1 g of (2,2,3, 3,4,4,5,5,6,6,7,7,7-tridecafluorohepthyl)-oxirane(2,2,3,3,4, 4,5,5,6,6,7,7,7-tridecafluorohepthyl-oxirane) represented by the formula (3) (n=5) as an epoxy-based monomer. Then, the obtained mixture was stirred and mixed at a speed of 40 rpm and at room temperature for three hours, so that 122.2 g of a black matrix composition was prepared. The binder resin used in the present example consisted of about 3 g of acrylate-based copolymer of the formula (2) (x:y=2:3; weight average molecular weight: 5000) and about 11 g of glycidylmethacrylate/styrene/cyclohexylmethacrylate (weight ratio=40:30:30) copolymer (weight average molecular weight: 15,000). Thus, about 122.2 g of the black matrix composition is acquired.

EXAMPLE 2

About 122.2 g of a black matrix composition was obtained in the same manner as described in Example 1 except for the binder resin. A binder resin in this example consisted of about 3 g of acrylate-based copolymer of the formula (2) (x:y=2:3; weight average molecular weight: 5000) and about 11 g of glycidylmethacrylate/cyclohexylmethacrylate (weight ratio=40:30) copolymer (weight average molecular weight: 15,000).

EXAMPLE 3

About 122.2 g of a black matrix composition was prepared by the same manner as described in Example 1 except for the binder resin. A binder resin in this example consisted of about 3 g of acrylate-based copolymer of the formula (2) (x:y=2:3; weight average molecular weight: 5000) and about 11 g of glycidymethacrylate/styrene (weight ratio=40:30; weight average molecular weight: 15,000) copolymer.

EXAMPLE 4

122.2 g of a black matrix composition was prepared in the same manner as described in Example 1 except for the binder resin. A binder resin in this example consisted of about 3 g of acrylate-based copolymer of the formula (2) (x:y=2:3; weight average molecular weight: 5000) and about 11 g of styrene/cyclohexylmethacrylate (weight ratio=40:30; weight average molecular weight: 15,000) copolymer.

COMPARATIVE EXAMPLE 1

Into about 43.1 g of prophyleneglycol monomethyl ether acetate (PGMEA) as a solvent, added were about 50 g of carbon black aqueous solution (15 wt %; average diameter of pigment: 90 nm), about 0.1 g of 2,4-bis(trichlorometyl)-6-p-methoxystyryl-s-triazine as a photoinitiator, about 15 g of dipentaerythritol hexacrylate as a photo-polymerizable monomer, about 14 g of glycidylmethacrylate/styrene/cyclohexylmethacrylate (weight ratio=40:30:30) copolymer (weight average molecular weight: 15,000) as a binder resin. Then, the obtained mixture was stirred and mixed at a speed of about 40 rpm and at room temperature for three hours, and thus about 122.2 g of a black matrix composition was prepared.

Components of the black matrix compositions of Examples 1~4 and Comparative Example 1 are shown in Table 1.

TABLE 1

Components of the black matrix composition

| | Photoinitiator | Photo-polymerizable Monomer |
|---|---|---|
| Example 1 | 2,4-bis(trichloromethyl)-6-p-methoxystyryl-s-triazine | dipentaerythritol hexacrylate |
| Example 2 | 2,4-bis(trichloromethyl)-6-p-methoxystyryl-s-triazine | dipentaerythritol hexacrylate |
| Example 3 | 2,4-bis(trichloromethyl)-6-p-methoxystyryl-s-triazine | dipentaerythritol hexacrylate |
| Example 4 | 2,4-bis(trichloromethyl)-6-p-methoxystyryl-s-triazine | dipentaerythritol hexacrylate |
| Comparative Example 1 | 2,4-bis(trichloromethyl)-6-p-methoxystyryl-s-triazine | dipentaerythritol hexacrylate |

| | Binder resin | Epoxy-based monomer |
|---|---|---|
| Example 1 | Binder resin consisting of acrylate-based copolymer of the formula (2) (x:y = 2:3; weight average molecular weight = 5000) and glycidylmethacrylate/styrene/cyclohexylmethacrylate (weight ratio = 40:30:30) copolymer (weight average molecular weight = 15,000) | (2,2,3,3,4,4,5,5,6,6,7,7,7-tridecafluorohepthyl)-oxirane-(2,2,3,3,4,4,5,5,6,6,7,7,7-tridecafluorohepthyl-oxirnane) |
| Example 2 | Binder resin consisting of acrylate-based copolymer of the formula (2) (x:y = 2:3; weight average molecular weight = 5000) and glycidylmethacrylate/styrene (weight ratio = 40:30:30) copolymer (weight average molecular weight = 15,000) | (2,2,3,3,4,4,5,5,6,6,7,7,7-tridecafluorohepthyl)-oxirane-(2,2,3,3,4,4,5,5,6,6,7,7,7-tridecafluorohepthyl-oxirnane) |
| Example 3 | Binder resin consisting of acrylate-based copolymer of the formula (2) (x:y = 2:3; weight average molecular weight = 5000) and glycidylmethacrylate/cyclohexylmethacrylate (weight ratio = 40:30:30) copolymer (weight average molecular weight = 15,000) | (2,2,3,3,4,4,5,5,6,6,7,7,7-tridecafluorohepthyl)-oxirane-(2,2,3,3,4,4,5,5,6,6,7,7,7-tridecafluorohepthyl-oxirnane) |
| Example 4 | Binder resin consisting of acrylate-based copolymer of the formula (2) (x:y = 2:3; weight average molecular weight = 5000) and styrene/cyclohexylmethacrylate (weight ratio = 40:30:30) copolymer (weight average molecular weight = 15,000) | (2,2,3,3,4,4,5,5,6,6,7,7,7-tridecafluorohepthyl)-oxirane-(2,2,3,3,4,4,5,5,6,6,7,7,7-tridecafluorohepthyl-oxirnane) |

TABLE 1-continued

Components of the black matrix composition

| Comparative Example 1 | glycidylmethacrylate/styrene/cyclohexylmethacrylate (weight ratio = 40:30:30) copolymer (weight average molecular weight = 15,000) |
|---|---|

Black Matrix Pattern

EXAMPLE 5

The black matrix composition prepared in Example 1 was dropped onto a glass substrate having a thickness of about 0.7 mm, and the resulting coating of black matrix was rotated at a speed of about 500 rpm and then dried at a temperature of about 115° C. for ninety seconds. Thus, a black matrix composition layer having thickness of about 1.7 μm was formed on the glass substrate. A mask was mounted over the black matrix composition layer and irradiated with ultraviolet light having a wavelength of about 450 nm. Then, the black matrix composition layer on the glass substrate was immersed into an aqueous solution of potassium hydroxide, and thus a non-exposed portion of the black matrix composition layer (which was not exposed to ultraviolet rays) was developed and removed. Then, in order to perform a thermal cross-linking reaction of the exposed and thus non-developed black matrix composition layer, the black matrix composition layer was heated to reach a temperature of about 220° C. After the cross-linking reaction was completed, the black matrix composition layer that was cross-linked remained at room temperature for one hour to form a black matrix pattern on the glass substrate.

EXAMPLE 6

A black matrix pattern was formed in substantially the same manner as in Example 5 except for the kind of black matrix composition. In this example, the black matrix composition prepared in Example 2 was used instead of the black matrix composition used in Example 1.

EXAMPLE 7

A black matrix pattern was formed in substantially the same manner as in Example 5 except for the kind of black matrix composition. In this example, the black matrix composition prepared in Example 3 was used instead of the black matrix composition used in Example 1.

EXAMPLE 8

A black matrix pattern was formed in substantially the same manner as in Example 5 except for the kind of black matrix composition. In this example, the black matrix composition prepared in Example 4 was used instead of the black matrix composition used in Example 1.

COMPARATIVE EXAMPLE 2

The black matrix composition prepared in Comparative Example 1 was dropped onto a glass substrate having a thickness of about 0.7 mm. The coating of black matrix is then rotated at a speed of about 500 rpm and then dried at a temperature of about 115° C. for ninety seconds. Thus, a black matrix composition layer having a thickness of about 1.7 μm was formed on the glass substrate. A mask was mounted over the black matrix composition layer and irradiated with ultraviolet light having a wavelength of about 436 nm. The black matrix composition layer on the glass substrate was then immersed into an aqueous solution of potassium hydroxide, and thus a non-exposed portion of the black matrix composition layer, which was not exposed to ultraviolet rays, was developed and removed to form a black matrix pattern on the glass substrate.

Experiment 1: Measurement of Contact Angle

Color ink (blue; pigment dispersion type; one drop) was dropped onto each of black matrixes in black matrix patterns in Examples 5~8 and Comparative Example 2. Then, a contact angle of color ink was measured at each of the black matrixes. Measured results are shown in Table 2 as follows:

TABLE 2

Results of measured contact angles

| Example | Contact angle (degree) |
|---|---|
| Example 5 | 67 |
| Example 6 | 69.5 |
| Example 7 | 68.5 |
| Example 8 | 68.5 |
| Comparative Example 2 | 14.5 |

As shown in Table 2, when color ink was dropped onto the black matrix prepared using the black matrix composition according to embodiments of the present invention, the contact angle of the color ink at a surface of the black matrix was larger than the contact angle at a surface of the black matrix of Comparative Example 2. Referring to Table 2, the contact angle of color ink at a surface of the black matrix of Comparative Example 2 was significantly smaller than the contact angles for Examples 5~8. Accordingly, it was confirmed that the black matrixes of Examples 5~8 have high hydrophobicity.

Experiment 2: Observation of an Ink Bleed

In order to observe ink bleed, color ink (blue; pigment dispersion type; six drops) was dropped into a pixel area formed on each of the black matrixes of Examples 5~8 and Comparative Example 2, respectively. The degree of ink bleed was then observed. The observation of ink bleed was performed for the black matrix of Comparative Example 2(a) and the black matrix of Example 5, respectively.

Figure 3A:
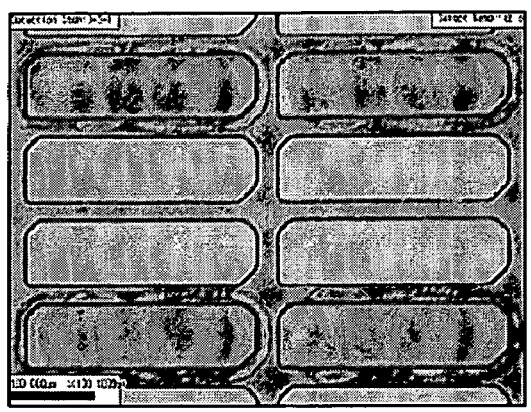
FIG. 3A is a photograph showing an ink bleed on a conventional black matrix pattern.
Figure 3B:
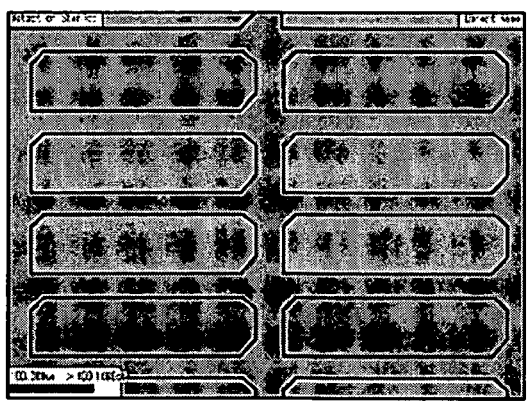
FIG. 3B is a photograph showing the reduced ink bleed on a black matrix in accordance with an embodiment of the invention.

Referring to FIG. 3A, ink bleed was almost completely absent around the black matrix of Example 5. In contrast, as seen in FIG. 3B, ink bleed was readily observed around the pixel area of the black matrix of Comparative Example 2.

In accordance with the present invention, the black matrix formed from the black matrix composition according to the present invention has high hydrophobicity to increase the contact angle of hydrophilic ink, to thereby prevent ink bleed generated abound the pixel area.

Further, ink bleed is prevented, so that a color property of the liquid crystal display device is improved. Also, a liquid crystal display device including the black matrix pattern according to the present invention provides improved display quality.

Having described the examples of the present invention and its advantages, it is noted that various changes, substitutions and alterations can be made herein without departing from the spirit and scope of the invention as defined by appended claims.

What is claimed is:

1. A black matrix composition comprising:

40 parts by weight of a pigment dispersion;

0.1 to 1.0 part by weight of a photoinitiator;

5 to 20 parts by weight of a photo-polymerizable monomer;

5 to 20 parts by weight of a binder resin comprising an acryl-based copolymer containing fluorine and having a hydroxyl group combined with a side chain of the acryl-based copolymer;

0.1 to 0.5 part by weight of epoxy-based monomer containing fluorine; and 35 to 55 parts by weight of a solvent.

2. The black matrix composition of claim 1, wherein the pigment dispersion comprises carbon black.

3. The black matrix composition of claim 1, wherein the photoinitiator comprises at least one selected from the group consisting of an acetophenone-based compound, a biimidazole-based compound and a triazine-based compound.

4. The black matrix composition of claim 3, wherein the photoinitiator comprises at least one selected from the group consisting of 2-epoxyethyl-2-{4-[2,4-bis(trichloromethyl)-s-triazine-6-yl]phenylthio}acetate, 2,4-bis(trichloromethyl)-6-p-methoxystyryl-s-triazine, and cyclohexyl-2-{4-[2,4-bis(trichloromethyl)-s-triazine-6-yl]phenylthio}acetate.

5. The black matrix composition of claim 1, wherein the photo-polymerizable monomer comprises at least one selected from the group consisting of pentaerythritol triacrylate, dipentaerythritol pentacrylate and dipentaerythritol hexacrylate.

6. The black matrix composition of claim 1, wherein the acryl-based copolymer comprises a copolymer of formula (1):

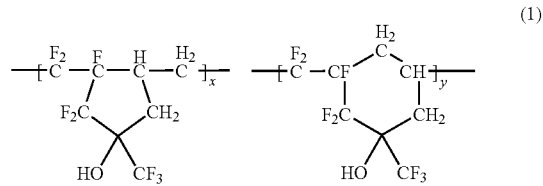

(1)

wherein 'X' denotes a natural number of 10 to 1000 and 'Y' denotes a natural number of 10 to 1000.

7. The black matrix composition of claim 1, wherein the binder resin further comprises a polymer polymerized from monomers comprising at least one selected from the group consisting of glycidyl methacrylate, styrene and cyclohexyl methacrylate.

8. The black matrix composition of claim 7, wherein the binder resin comprises about 400 to about 500 parts by weight of the polymer based on 100 parts by weight of the acryl-based copolymer.

9. The black matrix composition of claim 1, wherein the acryl-based copolymer has an average molecular weight of about 3000 to about 10000.

10. The black matrix composition of claim 1, wherein the epoxy-based monomer comprises at least one selected from the group consisting of compounds of formulae (2) and (3):

$$\text{(2)} \quad \underset{H_2}{\overset{O}{\triangle}}\underset{}{C}\text{-}(\underset{F_2}{C})_n\text{-}CF_3$$

$$\text{(3)} \quad \underset{H_2}{\overset{O}{\triangle}}\underset{}{C}\text{-}(\underset{F_2}{C})_n\text{-}\underset{CF_3}{\overset{CF_3}{CF}}$$

wherein 'n' denotes a natural number of 1 to 20.

11. The black matrix composition of claim 1, wherein the solvent comprises at least one selected from the group consisting of propyleneglycol monomethyl ether, propyleneglycol monomethyl ether acetate, ethyleneglycol monomethyl ether acetate, ethylethoxy propionate, cyclohexanone and diethyleneglycol dimethyl ether.

12. The black matrix composition of claim 1, further comprising about 0.001 to about 0.002 part by weight of additives based on about 40 parts by weight of the pigment dispersion, the additives comprising at least one selected from the group consisting of a surfactant and an anti-foaming agent.

13. A method of forming a black matrix pattern comprising:

coating a black matrix composition on a base substrate and drying the black matrix composition to form a black matrix composition layer on the base substrate, the black matrix composition comprising:

40 parts by weight of a pigment dispersion;

0.1 to 1.0 part by weight of a photoinitiator;

5 to 20 parts by weight of a photo-polymerizable monomer;

5 to 20 parts by weight of a binder resin comprising an acryl-based copolymer containing fluorine and having a hydroxyl group combined with a side chain of the acryl-based copolymer;

0.1 to 0.5 part by weight of epoxy-based monomer containing fluorine; and 35 to 55 parts by weight of a solvent;

exposing the black matrix composition layer through a photo mask disposed over the black matrix composition layer to partially photo-polymerize the exposed black matrix composition layer;

providing the black matrix composition layer with a developing solution to partially develop the black matrix composition layer; and heating the black matrix composition layer so as to cure and cross-link the black matrix composition to form a thermally cross-linked resin in the black matrix composition layer.

14. The method of claim 13, wherein the exposure of the black matrix composition layer comprises, radiating a light into the black matrix composition layer to form a free radical molecule from the photoinitiator; and polymerizing the photo-polymerizable monomers using the free radical molecule as a polymerizing initiator to form a photo-polymer.

15. The method of claim 13, wherein the light has a wavelength of about 350 nm to about 500 nm.

16. The method of claim 13, wherein the partial development of the black matrix composition is performed at a non-exposed portion of the black matrix by the developing solution.

17. The method of claim 16, wherein the developing solution comprises potassium hydroxide (KOH).

18. The method of claim 17, wherein the partial development of the black matrix composition layer comprises reacting the developing solution with the hydroxyl group of the binder resin to form a salt.

19. The method of claim 18, wherein the salt comprises a compound of formula (4):

$$\text{(4)}$$

wherein 'X' denotes a natural number of 10 to 1000 and 'Y' denotes a natural number of 10 to 1000.

20. The method of claim 13, wherein the forming the thermally cross-linked resin comprises opening the epoxy-based monomer through a chemical reaction represented by a chemical equation (1):

$$\text{(1)}$$

wherein 'n' denotes a natural number of 1 to 20.

21. The method of claim 20, wherein the chemical reaction is performed at a temperature of about 200° C. to about 250° C. for about 0.7 hour to about 2 hours.

22. The method of claim 20, wherein the thermally cross-linked resin comprises a polymer of formula (5):

$$\text{(5)}$$

wherein 'X' denotes a natural number of 10 to 1000 and 'Y' denotes a natural number of 10 to 1000.

23. A black matrix comprising:

a photo-polymer polymerized from photo-polymerizable monomers comprising at least one selected from the group consisting of pentaerythritol triacrylate, dipentaerythritol pentacrylate and dipentaerythritol hexacrylate by using a photoinitiator comprising at least one selected from the group consisting of an acetophenone-based compound, a biimidazole-based compound and a triazine-based compound; and a thermally cross-linked resin comprising a polymer of formula (5):

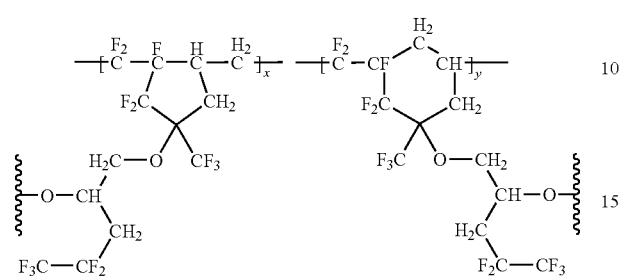

(5)

wherein 'X' denotes a natural number of 10 to 1000 and 'Y' denotes a natural number of 10 to 1000.

24. The black matrix of claim 23, wherein the black matrix comprises the photo-polymer and the thermally cross-linked resin at a weight ratio of about 1:1.

25. A method of manufacturing a color filter substrate comprising:

coating a black matrix composition on a base substrate and drying the black matrix composition to form a black matrix composition layer on the base substrate, the black matrix composition comprising:
40 parts by weight of a pigment dispersion;
0.1 to 1.0 part by weight of a photoinitiator;
5 to 20 parts by weight of a photo-polymerizable monomer;
5 to 20 parts by weight of a binder resin comprising an acryl-based copolymer containing fluorine and having a hydroxyl group combined with a side chain of the acryl-based copolymer;
0.1 to 0.5 part by weight of epoxy-based monomer containing fluorine; and
35 to 55 parts by weight of a solvent;

exposing the black matrix composition layer through a photo mask disposed over the black matrix composition layer to photo-polymerize the exposed black matrix composition layer;

washing the black matrix composition layer with a developing solution to develop unexposed portions of the black matrix composition layer;

heating the black matrix composition layer to cure and cross-link the black matrix composition layer so as to form a thermally cross-linked resin in the black matrix composition layer to thereby form a black matrix pattern; and injecting an ink into the black matrix pattern corresponding to the developed portion to form a color filter.

* * * * *